US007315414B2

(12) United States Patent
Swift et al.

(10) Patent No.: US 7,315,414 B2
(45) Date of Patent: Jan. 1, 2008

(54) MICROSCOPE WITH ADJUSTABLE STAGE

(75) Inventors: Alison C. Swift, San Jose, CA (US); David John Copeland, Milton, MA (US); Daniel J. Nelsen, Providence, RI (US); Aidan John Petrie, Jamestown, RI (US); Ryan Patrick White, Georgetown, MA (US); Robert J. Garay, San Jose, CA (US); Jacques Valiquette, San Jose, CA (US)

(73) Assignee: Swift Instruments, Inc., San Jose, CA (US)

( * ) Notice: Subject to any disclaimer, the term of this patent is extended or adjusted under 35 U.S.C. 154(b) by 0 days.

(21) Appl. No.: 10/815,967

(22) Filed: Mar. 31, 2004

(65) Prior Publication Data

US 2005/0219685 A1  Oct. 6, 2005

(51) Int. Cl.
*G02B 21/26* (2006.01)
(52) U.S. Cl. ...................... 359/392; 359/368
(58) Field of Classification Search .............. 359/368, 359/391, 392
See application file for complete search history.

(56) References Cited

U.S. PATENT DOCUMENTS

| 536,552 | A | 3/1895 | Swift |
| 2,604,815 | A | 7/1952 | Engelmann |
| 3,401,999 | A * | 9/1968 | Kephart et al. ............. 359/384 |
| D221,900 | S | 9/1971 | Samuelson et al. |
| 3,830,560 | A | 8/1974 | Onanian |
| 3,921,947 | A | 11/1975 | Adam |
| 4,643,550 | A | 2/1987 | Kitagawa et al. |
| 4,697,893 | A | 10/1987 | Fehr et al. |
| 4,772,123 | A | 9/1988 | Radner |
| 4,906,083 | A | 3/1990 | Sattler |
| 5,175,644 | A * | 12/1992 | Dosaka ....................... 359/392 |

(Continued)

FOREIGN PATENT DOCUMENTS

CA   2 262 912   8/2000

(Continued)

OTHER PUBLICATIONS

Microscope-Depot.com on-line catalog for Cordless Microscope "L-Series", http://www.microscope-depot.com/seriesL.asp.

(Continued)

*Primary Examiner*—Mark A. Robinson
(74) *Attorney, Agent, or Firm*—Fish & Richardson P.C.

(57) ABSTRACT

Systems and techniques relating to a microscope with an adjustable stage are described. A microscope includes a base, a support arm attached to and extending upwardly from the base, a head attached to the support arm, the head including a lens, and an eyepiece attached to the head. A stage is releasably attachable to the support arm between the head and the base at multiple locations, providing multiple working distances between a lower surface of the head and an upper surface of the stage. When the stage is attached to the support arm at a location, a working distance between the lower surface of the head and the upper surface of the stage is further adjustable to an either greater or lesser working distance. In another embodiment, microscopic and macroscopic viewing can both be provided using a lens changer with multiple lens positioned radially about an axis of rotation.

13 Claims, 12 Drawing Sheets

U.S. PATENT DOCUMENTS

| | | | |
|---|---|---|---|
| 5,270,855 A * | 12/1993 | Hasegawa | 359/368 |
| 5,394,272 A * | 2/1995 | Kvamme et al. | 359/744 |
| 5,489,771 A | 2/1996 | Beach et al. | |
| 5,703,714 A * | 12/1997 | Kojima | 359/368 |
| 5,737,134 A * | 4/1998 | Watanabe et al. | 359/821 |
| 5,781,338 A | 7/1998 | Kapitza et al. | |
| 5,796,487 A | 8/1998 | Guerra | |
| 5,892,539 A | 4/1999 | Colvin | |
| 5,930,034 A | 7/1999 | Fukumoto | |
| 6,043,890 A | 3/2000 | Spink et al. | |
| D423,029 S | 4/2000 | Kawahata | |
| D423,536 S | 4/2000 | Hashimoto | |
| 6,075,646 A * | 6/2000 | Suzuki | 359/434 |
| 6,160,662 A * | 12/2000 | Uchida et al. | 359/390 |
| 6,204,965 B1 | 3/2001 | Doering et al. | |
| 6,243,197 B1 | 6/2001 | Schalz | |
| 6,369,939 B1 | 4/2002 | Weiss et al. | |
| 6,388,807 B1 | 5/2002 | Knebel et al. | |
| 6,400,395 B1 | 6/2002 | Hoover et al. | |
| D459,744 S | 7/2002 | Apothéloz | |
| 6,594,075 B1 | 7/2003 | Kanao et al. | |
| 6,674,575 B1 | 1/2004 | Tandler et al. | |
| 6,714,348 B2 | 3/2004 | Dunn | |
| 2002/0075563 A1 | 6/2002 | Aizaki et al. | |
| 2003/0090791 A1 | 5/2003 | Dunn | |
| 2003/0165011 A1 | 9/2003 | Tandler et al. | |
| 2003/0223109 A1 | 12/2003 | Deverin et al. | |
| 2004/0027654 A1 | 2/2004 | Gonschor | |
| 2004/0027658 A1 | 2/2004 | Fu | |

FOREIGN PATENT DOCUMENTS

| | | |
|---|---|---|
| DE | 87 14 912 | 2/1988 |
| EP | 1316833 | 7/2004 |
| JP | 04-336445 | 11/1992 |
| JP | 2003-084204 | 3/2003 |
| JP | 2003-207718 | 7/2003 |
| JP | 2003-262797 | 9/2003 |
| WO | 01/01184 | 1/2001 |

OTHER PUBLICATIONS

Omni Optical.com on-line product information sheet for Konus microscope sets, http://www.omni-optical.com/micro/sm210.htm.

Ken-a-vision on-line product information sheet for Cordless Lighted Microscopes, http://www.ken-a-vision.com/cordlesscope.htm, 4 pp.

Fisher Scientific on-line catalog for Fisher Micromaster* Digital and Video Microscopes, https://www1.fishersci.com/Coupon?gid=2436392&cid=1328, 4 pp.

Product information sheet for Fisher Micromaster* Digital and Video Microscopes, Fisher Scientific Catalog, p. 913.

Product information sheet for Swift M2251C Cordless Compound Microscope, Swift Instruments, Inc., Scientific Instrument Division, San Jose, CA.

Product information sheet for Swift M2250 Series Intermediate Compound Microscope, Swift Instruments, Inc., Scientific Instrument Division, San Jose, CA.

MicroscopesRus on-line product information sheet for Compound Microscope http://www.microscopesrus.com/microscopebasics.htm, 2 pp.

"Basic Concepts in Optical Microscopy", Molecular Expressions Optical Microscopy /Primer: Anatomy of he Microscope, http://micro.magnet.fsu.edu/primer/anatomy/anatomy.html, 5 pp. , last update Nov. 2004.

On-line product information for Olympus BHT System Polarizing Light Microscope, http://www.sewanee.edu/chem/Chem&Art/default.html, 9 pp.

* cited by examiner

| Viewing Level | Eyepiece Lens | Distal Lens | Lens Changer Magnification (Combined) | Total Magnification | Working Distance (mm) | Field of View (mm) |
|---|---|---|---|---|---|---|
| Macroscopic | 10x | 1x | 0.5x | 5x | 80 | 32 |
| Macroscopic | 10x | 1x | 0.75x | 7.5x | 80 | 24 |
| Macroscopic | 10x | 1x | 1x (Neutral) | 10x | 80 | 16 |
| Macroscopic | 10x | 1x | 1.5x | 15x | 80 | 12 |
| Macroscopic | 10x | 1x | 2x | 20x | 80 | 8 |
| Macroscopic | 10x | 2x | 0.5x | 10x | 70 | 18 |
| Macroscopic | 10x | 2x | 0.75x | 15x | 70 | 14 |
| Macroscopic | 10x | 2x | 1x (Neutral) | 20x | 70 | 7 |
| Macroscopic | 10x | 2x | 1.5x | 30x | 70 | 5 |
| Macroscopic | 10x | 2x | 2x | 40x | 70 | 3 |
| Microscopic | 10x | 10x | 0.5x | 50x | 5 | 2.4 |
| Microscopic | 10x | 10x | 0.75x | 75x | 5 | 1.8 |
| Microscopic | 10x | 10x | 1x (Neutral) | 100x | 5 | 1.2 |
| Microscopic | 10x | 10x | 1.5x | 150x | 5 | 0.9 |
| Microscopic | 10x | 10x | 2x | 200x | 5 | 0.6 |

MICROSCOPE WITH ADJUSTABLE STAGE

BACKGROUND

The following description relates to a microscope with an adjustable stage.

A microscope is an optical instrument that uses a lens or a combination of lenses to produce magnified images of small objects, especially of objects too small to be seen by the unaided eye. Depending on the size of the object or the purpose for viewing the object, either microscopic or macroscopic viewing may be desirable. Microscopic viewing refers to viewing a microscopic specimen (a specimen that is not visible by the naked eye), or a microscopic portion of a macroscopic specimen, at relatively high magnification levels in a relatively small field of view. The lens or lenses used for microscopic viewing have short working distances, and the specimen is relatively close to an outermost lens. By contrast, macroscopic viewing refers to viewing a macroscopic specimen (a specimen that is visible by the naked eye) at relatively low magnification levels in a relatively larger field of view. The lens or lenses used for macroscopic viewing have longer working distances, and therefore larger specimens, for example, insects or rocks, may be viewed.

A conventional microscope providing a range of magnification levels may include multiple tubes including one or more lenses, the tubes mounted on a rotatable nosepiece, such that the lens or lenses within an optical path can be changed by rotating the nosepiece, thereby changing the magnification level. The more tubes included on a nosepiece, the heavier the microscope becomes. Additionally, the wider the range of magnification levels, the wider range of working distances required, and therefore the larger and heavier the microscope. Typically, fine and coarse adjustment mechanisms are provided to focus an image to be viewed through the microscope, which mechanisms may further adjust the working distance. Although the conventional microscope may provide a range of magnification levels, the magnification levels are all either for microscopic viewing or for macroscopic viewing, but not a combination of the two.

Another type of microscope, which provides a range of magnification levels for macroscopic viewing, includes a tumbler-style lens changer rotable about an axis that is substantially perpendicular to an optical path and including multiple lenses arranged radially about the axis, such that the tumbler is positionable into multiple positions to change the lens or lenses within the optical path, thereby changing the magnification level provided. The tumbler is located within a head that is movable within a relatively short distance relative to a stage, to provide different working distances for the different macroscopic magnification levels provided. Two such tumblers, or a duo-tumbler, are included in the head of the microscope, providing stereoscopic vision.

Microscopes are often used by students in an educational environment, such as a classroom, and may be used in the field, either by students or others, to examine specimens within their natural environment. The specimens to be viewed may range from live organisms to plant cells, requiring a wide range of magnification levels as well as both microscopic and macroscopic viewing. Having more than one type of microscope available to students, such as a microscope with macroscopic magnification levels and a second microscope with microscopic magnification levels, may be cost prohibitive. Further, it may be impractical for a user to carry two different microscopes into the field, when examining a wide range of specimens.

SUMMARY

Systems and techniques relating to a microscope with an adjustable stage are described. In general, in one aspect, the invention features a microscope including a base, a support arm attached to and extending upwardly from the base, and a head attached to the support arm, the head including a lens. An eyepiece is attached to the head and in optical communication with the lens. A stage is releasably attached to the support arm between the head and the base. The stage is releasably attachable to the support arm at multiple locations between the head and the base providing multiple working distances between a lower surface of the head and an upper surface of the stage. When the stage is attached to the support arm at a location, a working distance between the lower surface of the head and the upper surface of the stage is further adjustable to an either greater or lesser working distance. The microscope further includes an illuminator positioned between the base and the stage.

Embodiments may include one or more of the following. The head can include a first distal objective lens and a second distal objective lens, only one of which is in optical communication with the eyepiece at a given time. The stage can be releasably attached to the support arm in a first position, such that when the first distal objective lens is in optical communication with the eyepiece, microscopic viewing is provided with magnification exceeding 45× and a working distance of 10 millimeters or less. The stage can be releasably attached to the support arm in a second position, such that when the second distal objective lens is in optical communication with the eyepiece, macroscopic viewing is provided with magnification less than 45× and a working distance exceeding 10 millimeters.

The microscope can include at least three legs attached to the base. The legs can be pivotable between at least an open position, wherein the legs support the microscope in a substantially vertical position and a closed position. Each of the legs can include a foot pivotable about a point at which a foot attaches to a respective leg.

The microscope can include an illuminator that is battery-powered, and a battery electrically connected to the illuminator. The illuminator may be one or more light emitting diodes. The microscope can include a rack-adjustment mechanism for further adjusting the upper surface of the stage to either a greater or lesser working distance when the stage is attached to the support arm at allocation. The support arm can include a handle. The stage can include a frame and a container releasably attached to the frame, which container may be a substantially transparent container including an interior region configured to contain a specimen.

In general, in another aspect, the invention features a microscope including a base, a support arm attached to and extending upwardly from the base, and a head attached to the support arm. An eyepiece is attached to an upper portion of the head, and at least two distal objective lenses are attached to a lower portion of the head. A lens changer is positioned within the head and between the eyepiece and the distal objective lenses. The lens changer is rotatable about an axis that is substantially perpendicular to an optical path, includes a plurality of lenses arranged radially about the axis, and is rotatable between multiple positions. In a given position, one or more lenses of the multiple lenses is in an optical path extending from the eyepiece to an upper surface of a stage and including one of the distal objective lenses. A stage is attached to the support arm between the head and the base, and positionable to provide multiple working distances between a distal objective lenses and an upper surface of the stage. The stage can be positioned in a first position, such that when a first distal objective lens is in an optical path with the eyepiece, microscopic viewing is provided with magnification exceeding 45× and with a working distance of 10 millimeters or less. The stage can be positioned in a second position, such that when a second distal objective lens is in an optical path with the eyepiece, macroscopic viewing is provided with magnification less than 45× and with a working distance exceeding 10 millimeters. An illuminator is positioned between the base and the stage.

Embodiments may include one or more of the following. Microscopic viewing can be provided at magnification levels ranging from approximately 50× to 200× with an approximate working distance of 5 millimeters. Macroscopic viewing can be provided at magnification levels ranging from approximately 5× to 40× with approximate working distances ranging from 70 to 80 millimeters. The stage can be releasably attachable to the support arm at multiple locations between the head and the base, providing multiple working distances between a distal objective lens and an upper surface of the stage. When attached to the support arm at a location, a working distance between a distal objective lens and the upper surface of the stage is further adjustable to an either greater or lesser working distance.

The microscope can include at least three legs attached to the base. The three legs can be pivotable between at least an open position, wherein the legs support the microscope in a substantially vertical position and a closed position. The illuminator can be battery-powered, and the microscope can further include a battery electrically connected to the illuminator. The illuminator can be one or more light emitting diodes. The microscope can further include a rack-adjustment mechanism for further adjusting the upper surface of the stage to either a greater or lesser working distance when the stage is attached to the support arm at a location. The support arm can include a handle. The stage can include a frame and a container releasably attached to the frame, which container may be a substantially transparent container including an interior region configured to contain a specimen.

Embodiments may realize one or more of the following advantages. The microscope can provide both macroscopic and microscope viewing. A user having requirements for both macroscopic and microscopic may use only a single microscope, thereby providing a cost saving, and which microscope can be configured to be portable and relatively easy to take into the field. The microscope can be battery powered, and may include foldable legs, providing for easy storage and transport for use in the field. The lens changer provides a wide range of macroscopic and microscopic magnification levels, while providing a compact and relatively lightweight design. A releasably detachable stage provides a wide range of working distances, and allows for a variety of stage accessories for containing or displaying specimens for viewing.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described herein relate to a microscope including an adjustable stage. The microscope includes a releasably attached stage that may be attached to the microscope at multiple locations to provide multiple different working distances from an upper surface of the stage to a lower surface of a distal objective lens. The stage is movable, once secured to the microscope at one of the multiple locations, to further adjust a working distance. The range of working distances available allow both macroscopic and microscopic viewing levels to be achieved with the microscope, by switching between available lenses and adjusting the position of the stage accordingly.

Microscopic viewing, as used in this application, means viewing a microscopic specimen (or a microscopic portion of a macroscopic specimen), at a relatively high magnification level with a relatively short working distance and narrow field of view. The magnification level can be 45× or greater, and the working distance can be 10 millimeters or less. Macroscopic viewing, as used in this application, means viewing a macroscopic specimen, at a relatively low magnification level with a relatively long working distance and a wide field of view. The magnification level can be less than 45× and the working distance can be greater than 10 millimeters.

Figure 1A:
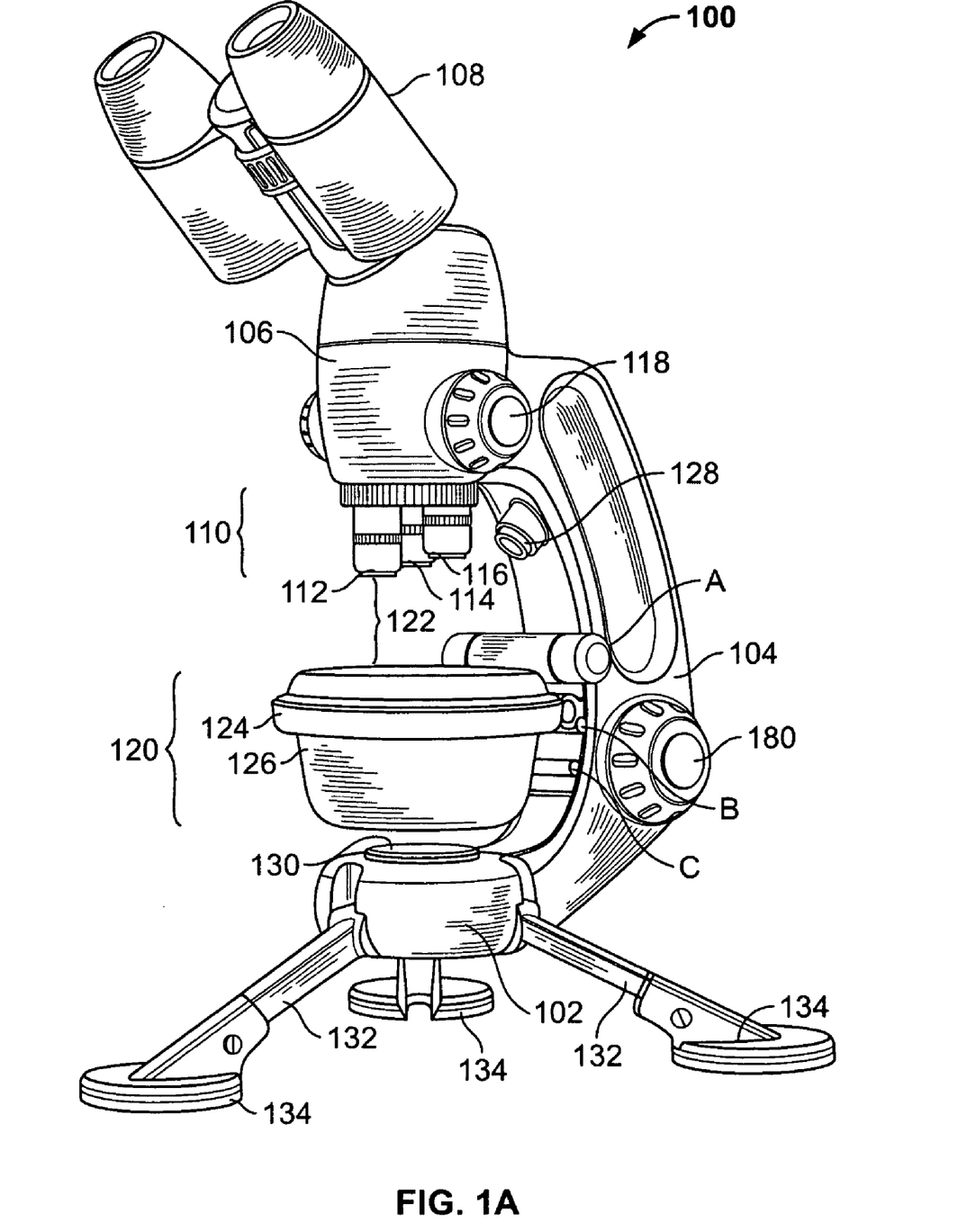
FIG. 1A is a perspective view of a microscope with an adjustable stage.
Figure 1B:
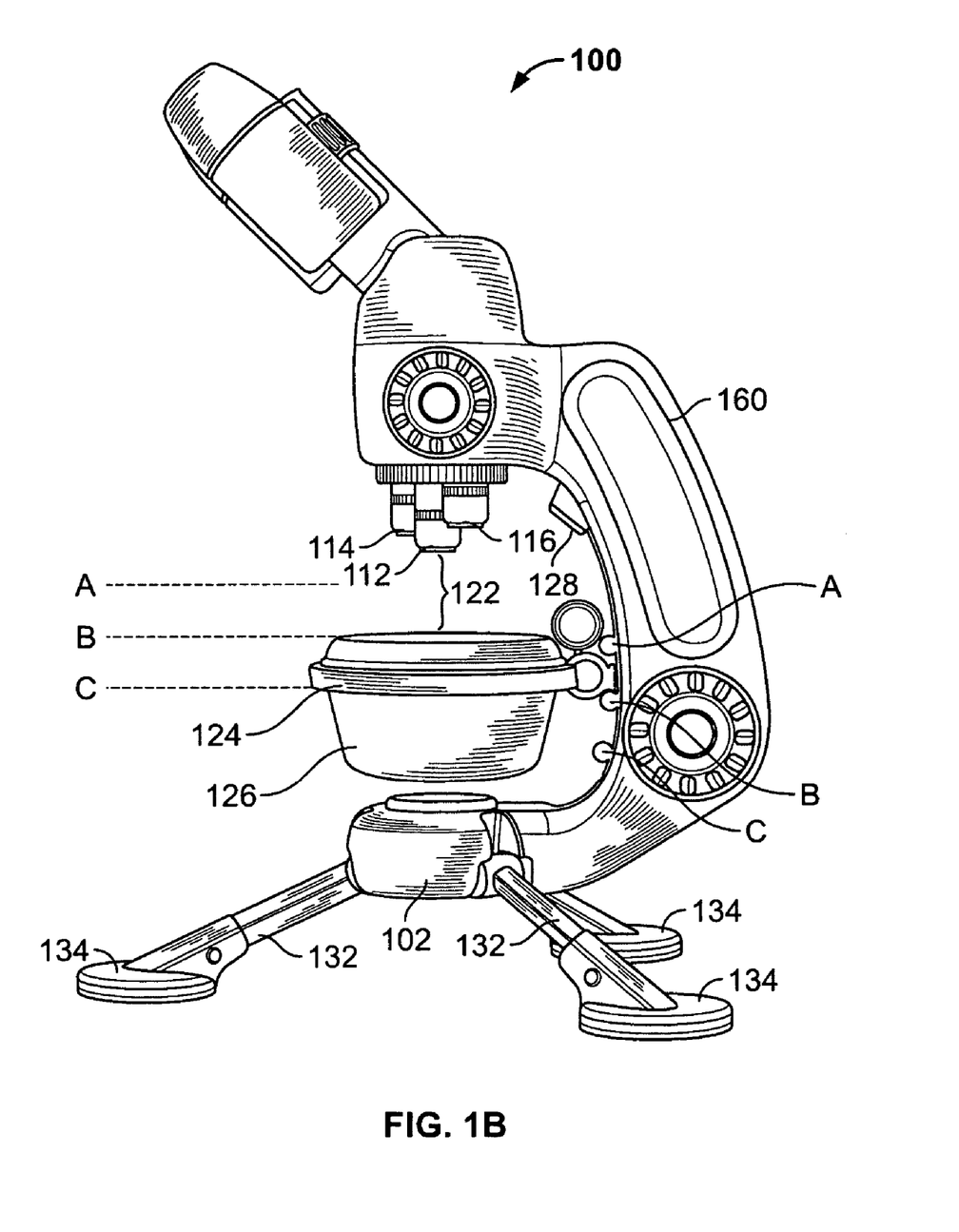
FIG. 1B is a side view of the microscope of FIG. 1A.

FIGS. 1A and 1B show an embodiment of the microscope 100 including a base 102 and a support arm 104 attached to the base and extending upwardly. A head 106 is attached to an upper portion of the support arm 104. An eyepiece 108 is attached to an upper portion of the head 106, and a rotatable nosepiece 110 is attached to a lower portion of the head 106. The rotatable nosepiece 110 includes at least two lens tubes, each including a distal objective lens. In this embodiment, the nosepiece 110 includes three lens tubes and three corresponding distal objective lenses 112, 114 and 116. The nosepiece 110 can be rotated in a substantially horizontal plane to position one of the three distal objective lenses 112–116 in an optical path extending from the eyepiece 108.

A lens changer (not visible) is included within the head 106, and is adjustable by a knob 118 attached to an outer surface of the head 106. The lens changer is described in further detail below.

A stage 120 is releasably attached to the support arm 104. In the embodiment depicted, the stage 120 can be clipped into three positions A, B and C (shown more clearly in FIG. 1B) on the support arm 104 to change the working distance 122 between a distal objective lens 112, 114 or 116 and an upper surface of the stage 120. The stage 120 can include a frame 124 supporting a container 126. The frame 124 can include a "male" portion of a clip that can mate with a "female" clip receivers formed on the exterior of the support arm 104 at positions A, B and C. Other configurations can be used to releasably attach the stage 120 to the support arm 104; the clips shown are merely exemplary.

The container 126 may be a transparent container that optionally includes a lid to contain a specimen, for example, a live insect or reptile. Alternatively, the container 120 may include an upper portion configured to support a slide for viewing a specimen mounted on the slide. Positioning the stage 120 in the uppermost position A provides a range of working distances 122 compatible with microscopic viewing using distal objective lens 112. Positioning the stage 120 in the middle and lowermost positions B and C provides a range of working distances 122 compatible with macroscopic viewing using distal objective lenses 114 and 116.

Optionally, the base 102 can be supported by three or more legs 132. In the embodiment shown, three legs 132 in a tripodal arrangement support the base 102. Each leg 132 can include a foot 134, which foot 134 may optionally be pivotable about a point at which the foot 134 attaches to the leg 132. Movement of the feet 134 allow the microscope 100 to be positioned such that the stage 120 is relatively level, even in uneven environments, for example, when using the microscope 100 in the field.

The base 102 includes an illuminator 130 to illuminate a specimen on or within the stage 120. An illuminator 130 can be any suitable light source, including a light bulb or one or more light emitting diodes. An optional second illuminator 128 can be included on the support arm 104 to provide incident light in the area of the stage 120. The illuminators 128 and 130 can be powered by electricity, in which case the microscope 100 can include an electrical cord with a plug on a distal end to mate with a standard, electrical receptacle. Alternatively, the illuminators 128 and 130 can be powered by one or more batteries, which optionally may be rechargeable. In one embodiment, a rechargeable battery can be housed within the base 102, and rechargeable by an AC adapter plugged into a female connector on the base 102 or support arm 104, which female connector is electrically connected to the rechargeable battery, and which AC adapter can be plugged into an external electrical receptacle to provide electricity to recharge the battery.

Figure 1C:
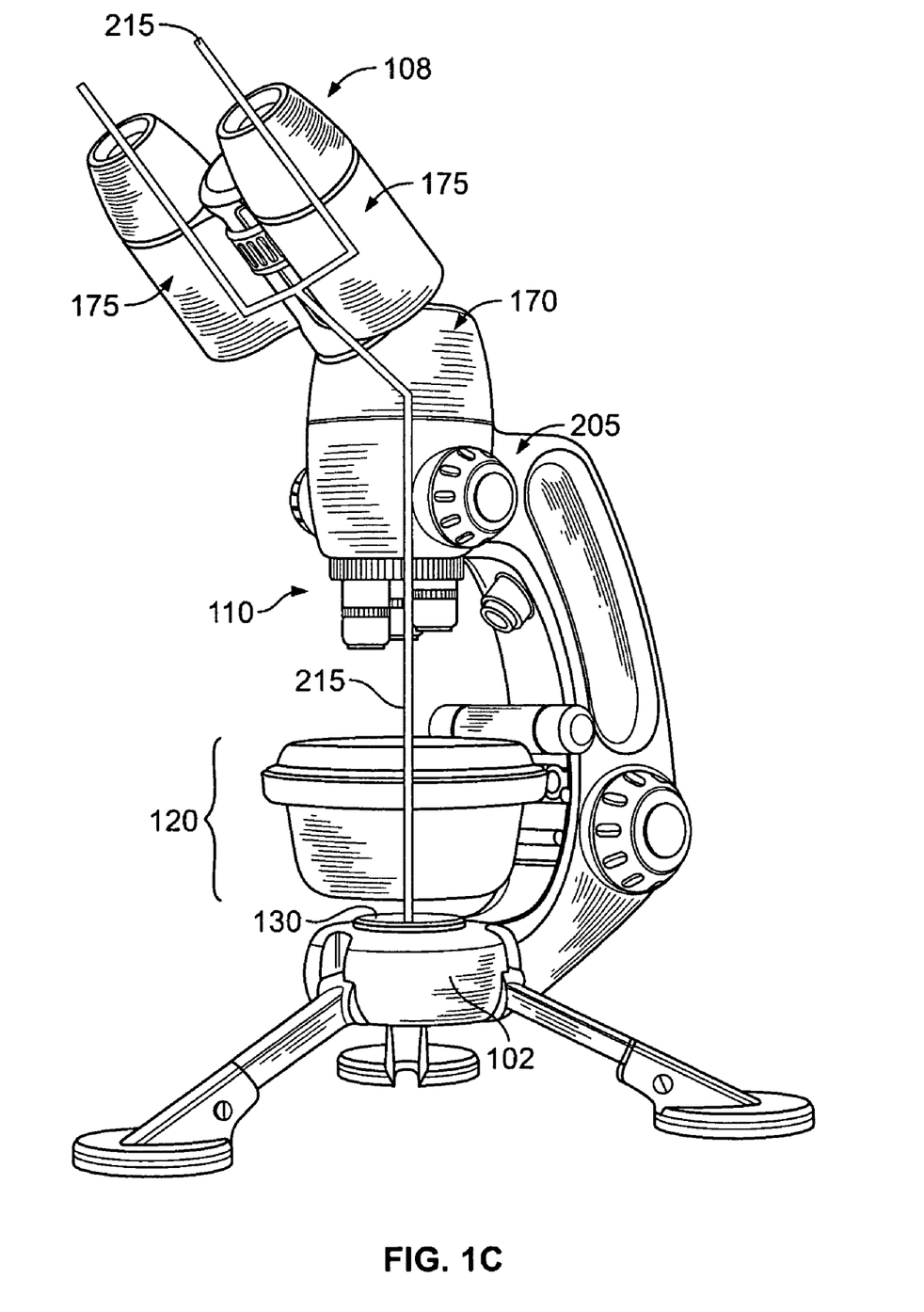
FIG. 1C is a perspective view of a microscope and a schematic view of an optical path through the microscope.

Referring to FIG. 1C, a perspective view of the microscope 100 is shown, with a schematic illustration of an optical path 215 superimposed on the microscope 100. The optical path 215 extends from the distal ends of the binocular-body eyepiece 108 to an illuminator 130 emitting light directed toward the stage 120, which may support a specimen for viewing. Light emits from an illuminator 130 mounted on the base 102, and is directed toward and through the stage 120, the light illuminating a specimen supported on the stage 120. The light passes through the distal objective lens 112 (or alternatively distal objective lens 114 or 116, depending on the orientation of the nosepiece 110) and enters the lens changer 205, described in detail below. After exiting the lens changer 205, the light encounters a prism 170 that redirects the light toward the eyepiece 108. The light encounters another prism and is split upon entering the eyepiece 108, and additional prisms 175 located within the eyepiece 108 direct each beam of light toward a lens included in each tube of the eyepiece 108. The beams of light exit the eyepiece 108. A user may position their eyes against the distal ends of the binocular-body eyepiece 108 and view a magnified image of the specimen.

Figure 2:
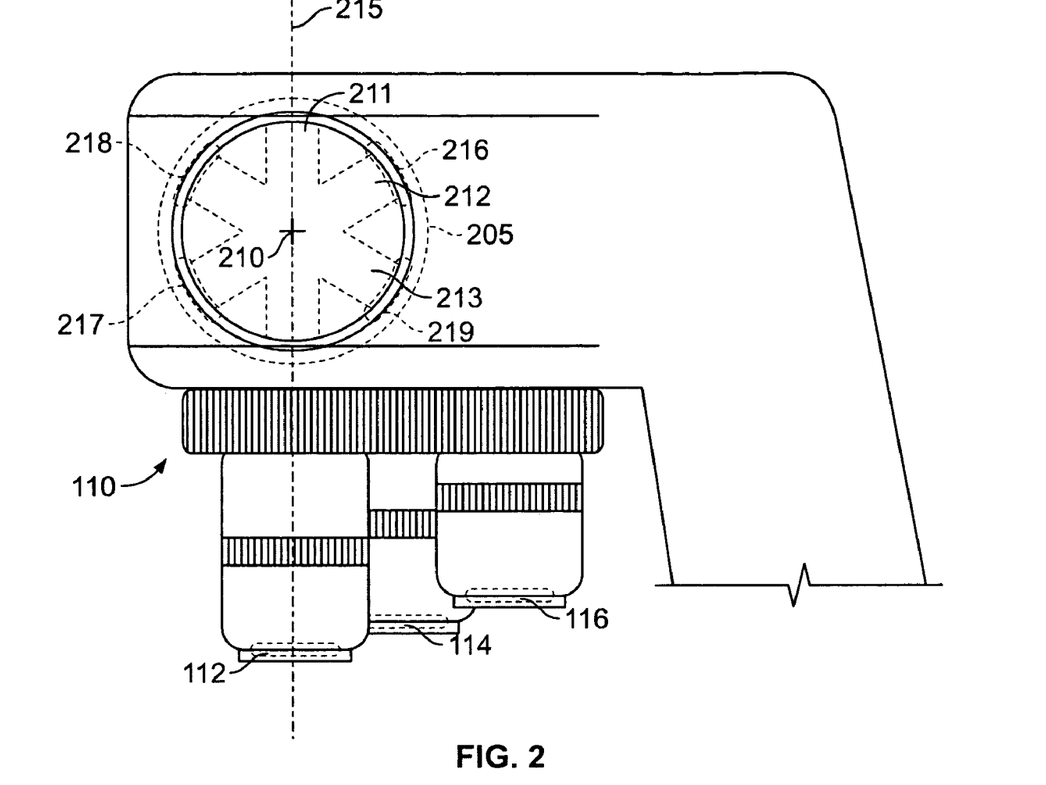
FIG. 2 is a side view of a portion of the microscope of FIGS. 1A–B, with a lens changer shown in phantom.

Referring to FIG. 2, a portion of the head 106, support arm 104 and the nosepiece 110 of the microscope 100 of FIGS. 1A–B is shown, with a cross-sectional view of the lens changer 205 shown in phantom. The lens changer 205 is rotatable about an axis 210 that is substantially perpendicular to the optical path 215 extending through the lens changer 205, which is a portion of the optical path 215 extending from the eyepiece 108 to the stage 120 described above in FIG. 1C. The lens changer 205 includes multiple lenses arranged radially about the axis 210. In the embodiment shown, there are three optical pathways through the lens changer 205, pathways 211, 212 and 213. When the lens changer 205 is rotated to the position shown, optical pathway 211 is within the optical path 215. Optical pathway 211 does not include lenses, and this position shall be referred to as the "neutral position" of the lens changer 205.

When the lens changer is rotated one position to the right, optical pathway 212 is within the optical path 215. Optical pathway 212 includes a pair of lenses 216 and 217 arranged opposite one another and substantially equidistant from the axis 210. Both lenses 216 and 217 are within the optical path 215 when the lens changer 205 is in this position. If the lens changer 205 is rotated 180°, optical pathway 212 is still within the optical path 215, as are lenses 216 and 217, however, the orientation of lenses 216 and 217 is reversed, i.e., lens 217 is positioned above 216 in the optical path 215, relative to a specimen. The magnification provided by the combination of the 216 and 217 lenses changes depending on the orientation of the optical pathway 212. Changing which lens is positioned at the top of the optical pathway 212 changes the magnification provided.

When the lens changer is rotated one position to the left from the neutral position, then optical pathway 213 is within the optical path 215. Optical pathway 213 includes a pair of lenses 218 and 219 arranged opposite one another and substantially equidistant from the axis 210. Both lenses 218 and 219 are within the optical path 215 when the lens changer 205 is in this position. If the lens changer 205 is rotated 180°, optical pathway 213 is still within the optical path 215, as are lenses 218 and 219, however, the orientation of lenses 218 and 219 is reversed. As described above in reference to optical pathway 212, the magnification provided by the combination of the 218 and 219 lenses changes depending on the orientation of the optical pathway 213.

The rotatable nosepiece 110 includes at least one distal objective lens capable of providing microscopic viewing and at least one distal objective lens capable of providing macroscopic viewing. In this embodiment, the nosepiece 110 includes one lens 112 capable of providing microscopic viewing and two lenses 114 and 116 capable of providing macroscopic viewing. The nosepiece 110 can be rotated in a substantially horizontal plane (or optionally in another configuration an inclined plane) to select the lens that is within the optical path 215. In other embodiments more or fewer distal objective lenses can be used (to a minimum of 2). In one alternative, a zoom objective lens, such as the zoom objective lens used in the Double A-52 model microscope available from Speed Fair Co., Ltd. of Hong Kong, can be used as a distal objective lens for microscopic viewing. The zoom objective lens can be rotated to provide magnification levels ranging from approximately 50× to 300×.

The magnification level provided by the microscope is a function of the combination of lenses in the optical path 215. The lenses within the optical path 215 can include a pair of lenses in the lens changer 205, a distal objective lens 112, 114 or 116, and one or more lenses included in the eyepiece 108. The total magnification provided is the product of the magnification of each lens within the optical path 215.

For macroscopic viewing, the nosepiece 110 is rotated to position distal objective lens 114 or 116 in the optical path 215. There are at least 5 different magnification levels available when either the distal objective lens 114 or 116 is in the optical path 215 (for a total of 10 macroscopic magnification levels), due to the following combinations of lenses from the lens changer 205: (1) the neutral position (optical pathway 211); (2) optical pathway 212 in a 216/217 orientation (i.e., 216 positioned nearest the eyepiece); (3) optical pathway 212 in a 217/216 orientation; (4) optical pathway 213 in a 218/219 orientation; and (5) optical pathway 213 in a 219/218 orientation.

Figure 3:
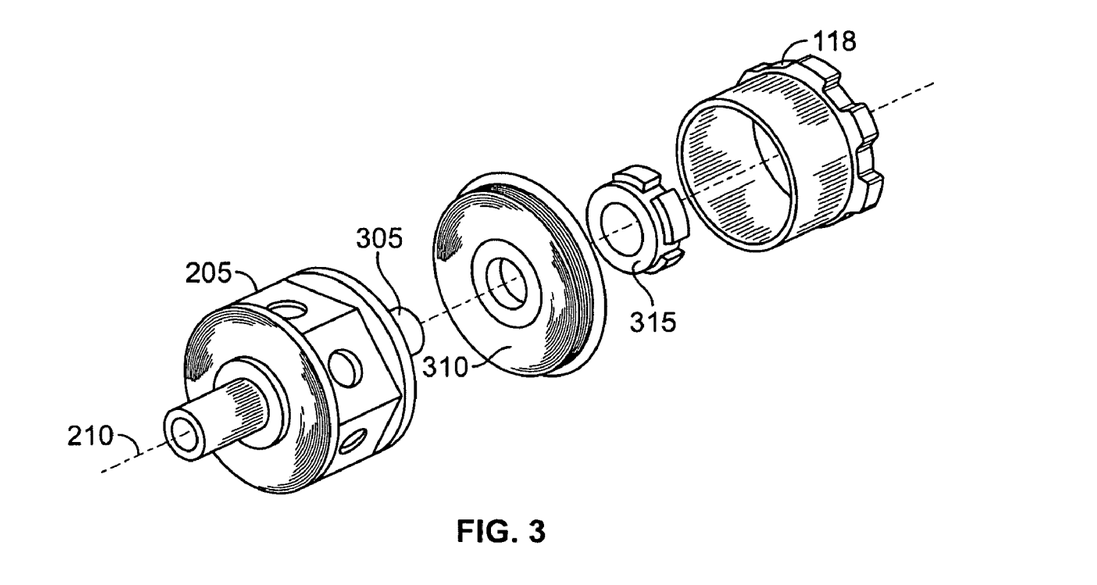
FIG. 3 is a partially exploded view of a lens changer.

Referring to FIG. 3, an exploded view of the lens changer 205 is shown. The lens changer 205 can be rotated using the knob 118 connected to a shaft 305, coincident with the axis 210, about which the lens changer 205 rotates. The knob 118 can be connected by way of a sleeve 310 and interior ring 315. The lenses can be, for example, achromatic glass lenses. In one embodiment, when lenses 216 and 217 are in the optical path 215 in the 216/217 orientation, in combination they provide a magnification level of about 0.5×. However, when lenses 216 and 217 are in the optical path 215 in the 217/216 orientation, in combination they provide a magnification level of about 2×. That is, the combined magnification level for the same two lenses is different, depending on which lens is positioned closest to the eyepiece 108.

Similarly, lenses 218 and 219 in combination can provide two different magnification levels, depending on whether lens 218 or 219 is closest to the eyepiece 108. In one embodiment, when lenses 218 and 219 are in the optical path 215 in the 218/219 orientation, in combination they provide a magnification level of about 1.5×. However, when lenses 218 and 219 are in the optical path 215 in the 219/218 orientation, in combination they provide a magnification level of about 0.75×. That is, the combined magnification level for the same two lenses is different, depending on which lens is positioned closest to the eyepiece 108.

Accordingly, in one embodiment, the lens changer 205 can provide about the following five magnification levels: 0.5×, 0.75×, 1× (neutral position), 1.5× and 2×. In another embodiment, one lens or a pair of lenses can be included in optical pathway 211, thereby adding additional magnification levels. In another embodiment, more or fewer optical pathways can be provided, for example, four optical pathways rather than three, further increasing the number of possible magnification levels.

For microscopic viewing, the nosepiece 110 is rotated to position distal objective lens 112 in the optical path 215. There are at least 5 different magnification levels available when the distal objective lens 112 is in the optical path 215, due to the combination of lenses available from the lens changer 205.

In one embodiment, the distal objective lenses 114 and 116 can be standard DIN or RMS achromatic lens having a magnification levels of 1× and 2× respectively, and the distal objective lens 112 can be a standard DIN or RMS achromatic lenses having a magnification level of 10×, although other magnification levels, such as 20× or 40× can be used. A lens can be included in each tube of the binocular-body eyepiece 108. In the embodiment described herein, the eyepiece 108 includes one lens for each eyepiece tube having a magnification of 10×.

Figure 4:
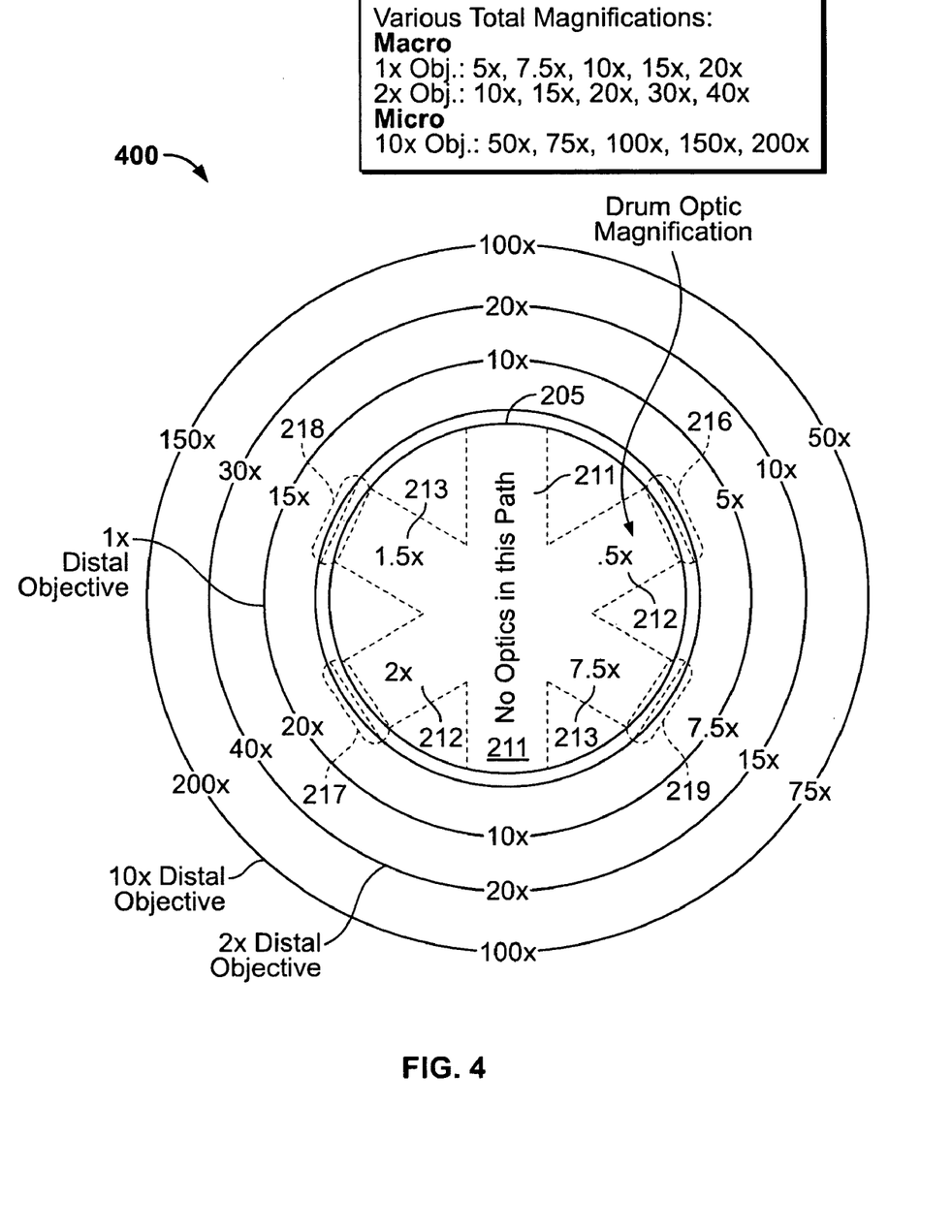
FIG. 4 is a schematic drawing of a lens changer and corresponding magnification levels.

Referring to FIG. 4, a schematic diagram 400 is shown illustrating the different magnification levels available when using each of the distal objective lenses 112–116 and when the lens changer 205 is orientated to provide the lens changer magnification level indicated within the different optical pathways in the lens changer 205. For example, when the lens changer 205 is orientated so that the optical pathway 212 is within the optical path 215, lens 218 is positioned nearest the eyepiece 108 (therefore providing a magnification of 1.5×), and the nosepiece is rotated such that the microscopic distal objective lens 112 is in the optical path 215, then the magnification level provided is 150×. That is, the total magnification=eyepiece magnification*lens changer magnification*distal objective lens magnification=10×*1.5×*10×=150×. In one embodiment, the schematic diagram 400 can be illustrated on the lens changer adjustment knob 118 to indicate to a user the magnification level provided by the different combinations of the lens changer 205 position and the nosepiece 110 position.

Each combination of lenses requires a certain working distance between the distal objective lens and the upper surface of the stage (or the specimen itself) to focus an image within the eyepiece 108 for a user. For microscopic viewing, the stage 120 is positioned in position A nearest the head 106, and for macroscopic viewing the stage 120 is positioned in either position B or C. The broken lines shown to the left of the stage 120 illustrate the position of the upper surface of the stage 120 when the stage 120 is attached to the support arm 104 in positions A, B and C respectively, showing the wide range of working distances available.

The working distance can be further adjusted once the stage 120 is attached in a position A, B or C by use of a secondary stage height adjuster. For example, referring to FIG. 5, a rack and pinion mechanism included in the support arm 104 can be used to further adjust the stage 120 using a coarse adjustment knob 505 and a fine adjustment knob 510. The knobs 505 and 510 are mounted on a shaft 515 extending through a portion of the support arm 104. A pinion 520 included in the center of the shaft 515 mates with a rack 525 positioned within the support arm 104, the rack substantially perpendicular to the shaft 515. By rotating the shaft 515, with either the coarse or fine adjustment knobs 505, 510, the stage 120, which is attached to the rack 525, moves upwardly or downwardly, depending on which way the knobs 505, 510 are turned and the shaft 515 rotates.

Figure 5:
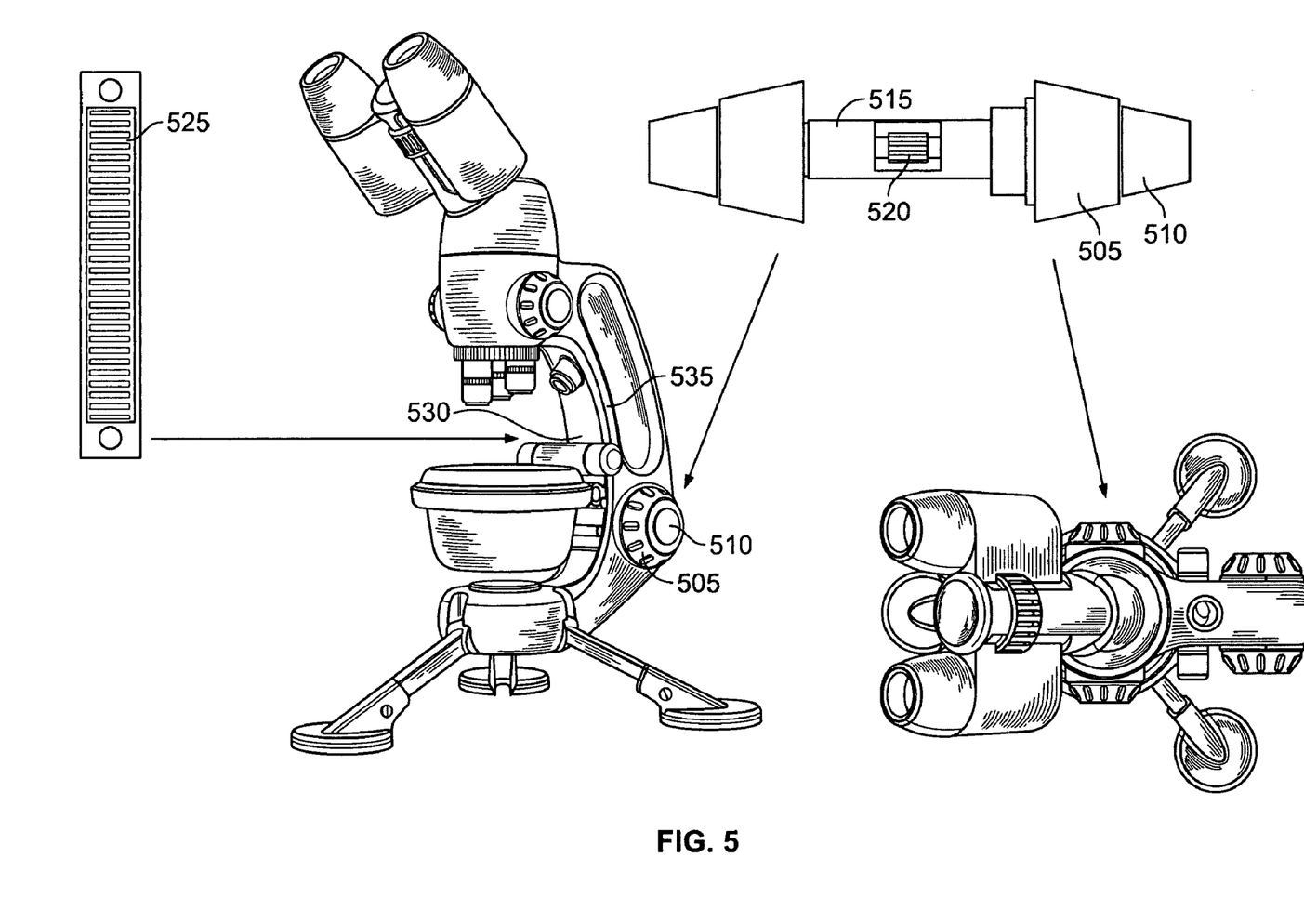
FIG. 5 is a perspective view of a microscope and a zoomed view of a coarse/fine adjustment mechanism.

In one embodiment, the stage 120 can be releasably attached to a block 530 positioned within a slot 535 formed in the support arm 104. The rack 525 is attached to or forms part of the block 520, facing toward the interior of the arm 104 (i.e., away from the stage 120). Once the stage 120 has been attached to the block 530, in either position A, B or C, the block 530 can be moved up or down within the slot 535 to further adjust the position of the stage 120. A user may rotate the knobs 505, 510 in either direct, causing the pinion 520 to mate with the rack 525, thereby moving the rack 525, and therefore the stage 120, in either an upward or downward direction. In one embodiment, the rack and pinion mechanism can be used to adjust the position of the stage 120 up to approximately 40 mm.

In one embodiment, the working distances when the stage 120 is in positions A, B and C are approximately 12 mm, 37 mm and 63 mm respectively, although the working distances are further adjustable by another 40 mm using the rack-adjustment mechanism described above.

Figure 6:
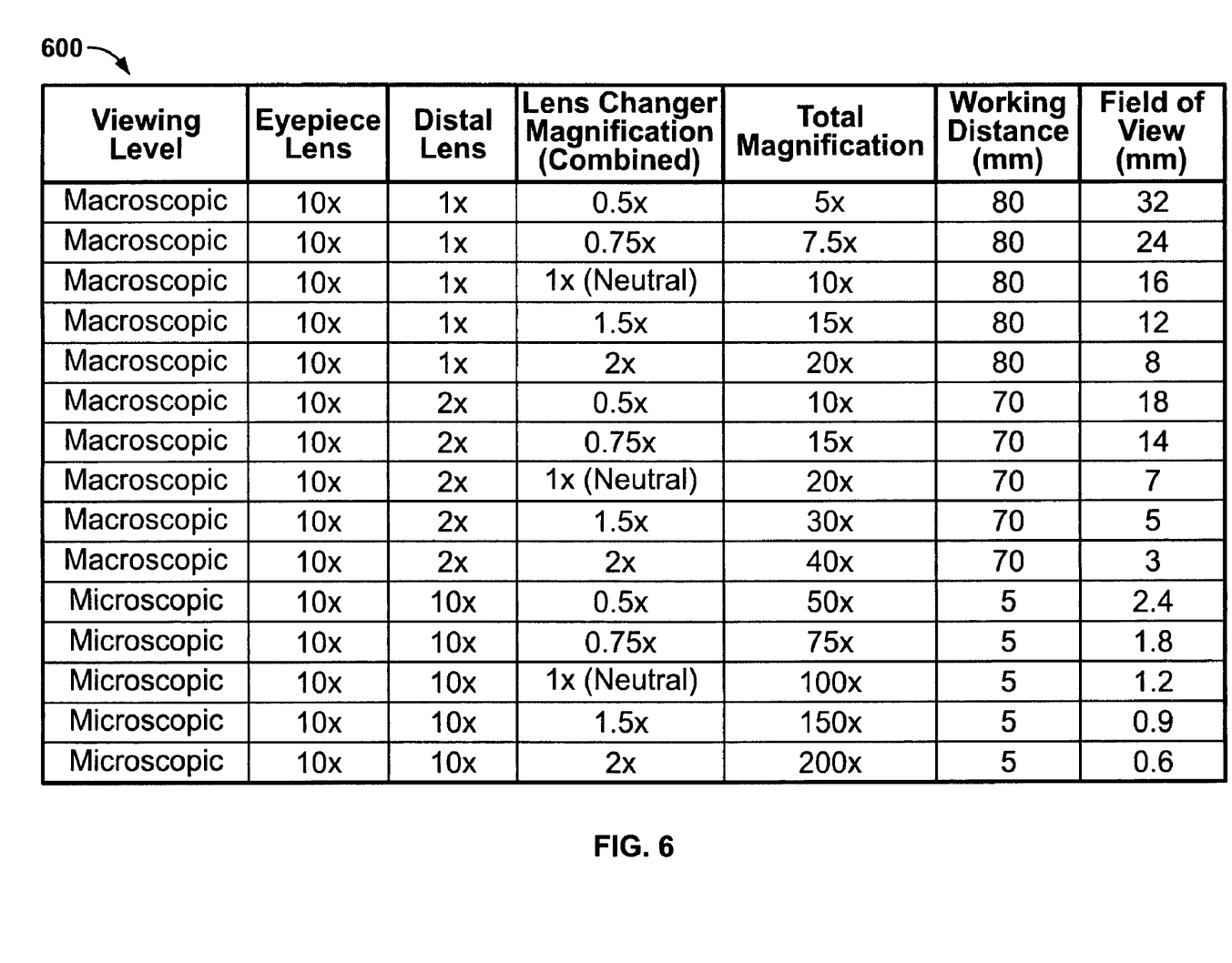
FIG. 6 is a table showing magnification levels and corresponding working distances and fields of view.

Referring to FIG. 6, a table 600 is shown illustrating the magnification levels and working distances for one embodiment of the microscope. For macroscopic viewing, magnification levels in the range of 5× to 40× are provided with approximate working distances ranging from 70 to 80 mm. For microscopic viewing, magnification levels in the range of 50× to 200× are provided with an approximate working distance of 5 mm. The field of view decreases as the magnification level increases. The field of view refers to the distance across an area visible to a user of the microscope when viewing at a given magnification.

Figure 7:
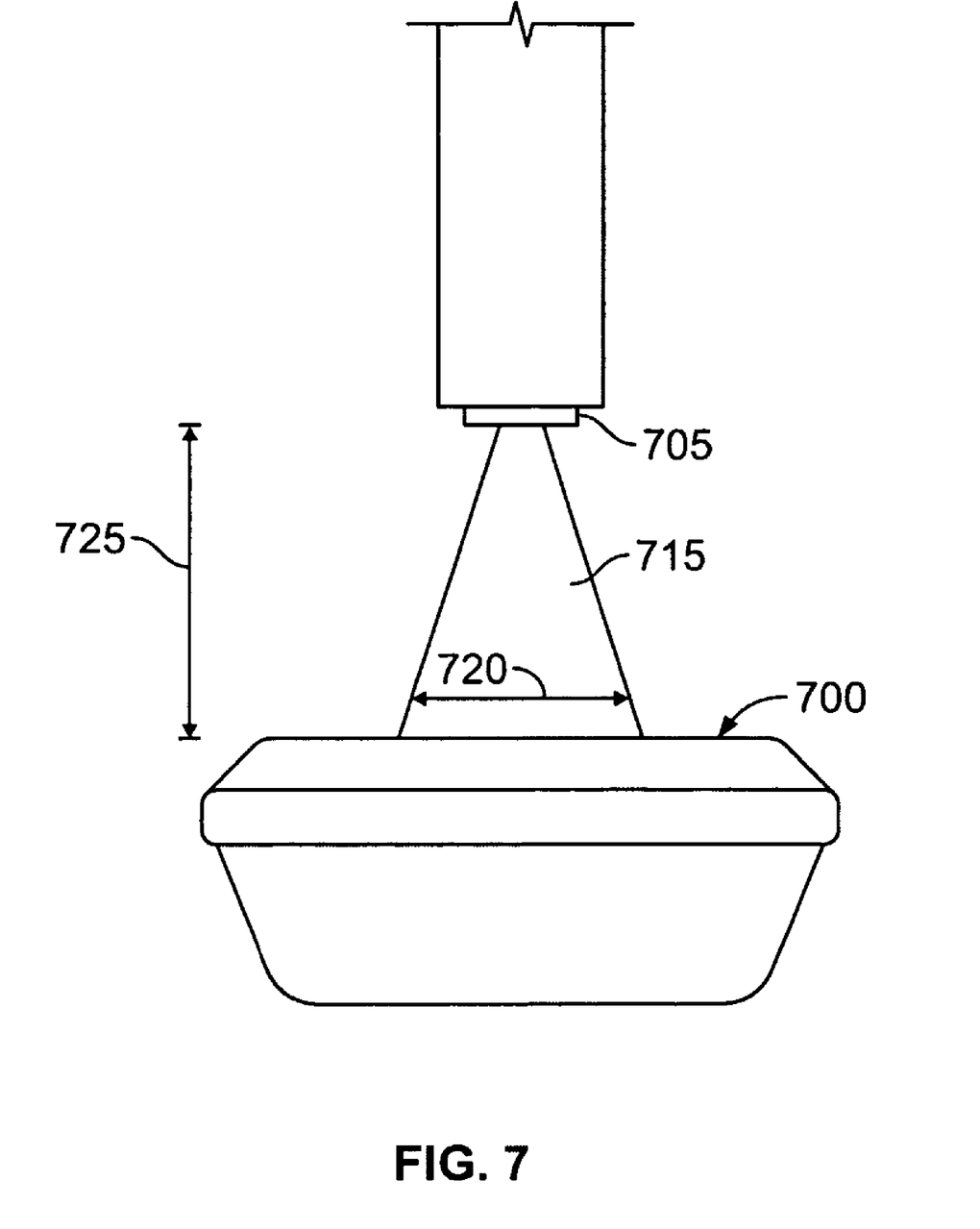
FIG. 7 is a schematic diagram showing a field of view.

For example, referring to FIG. 7, a distal objective lens 705 is shown positioned above a stage 700 upon which a specimen for viewing, such as a slide-mounted specimen, can be placed. The cone 715 schematically represents the field of view, which terminates at the upper surface of stage 700, at which point the field of view has a diameter measuring the distance indicated by the line 720. The working distance, that is, the distance between the distal objective lens 705 and the upper surface of the stage 700, is illustrated by the line 725. It is apparent from the drawing that as the working distance decreases, the diameter of the cone 715 representing the field of view narrows, and accordingly the field of view decreases. However, as the magnification level increases, the working distance generally must decrease. Therefore, as the magnification level increases, the field of view will decrease.

Referring again to FIG. 6, the approximate working distances and corresponding fields of view for the different magnification levels available in one embodiment of the microscope 100 are shown in sixth and seventh columns. At the lowest magnification, which is 5×, the approximate working distance is 80 mm and the approximate field of view is 22 mm. At the highest magnification, which is 200×, the approximate working distance is only 5 mm and the approximate field of view is reduced to 0.6 mm. The microscope 100 provides a wide range of magnification levels, working distances and fields of view, ranging from macroscopic at only 5× to microscopic at 200×.

Figure 8A:
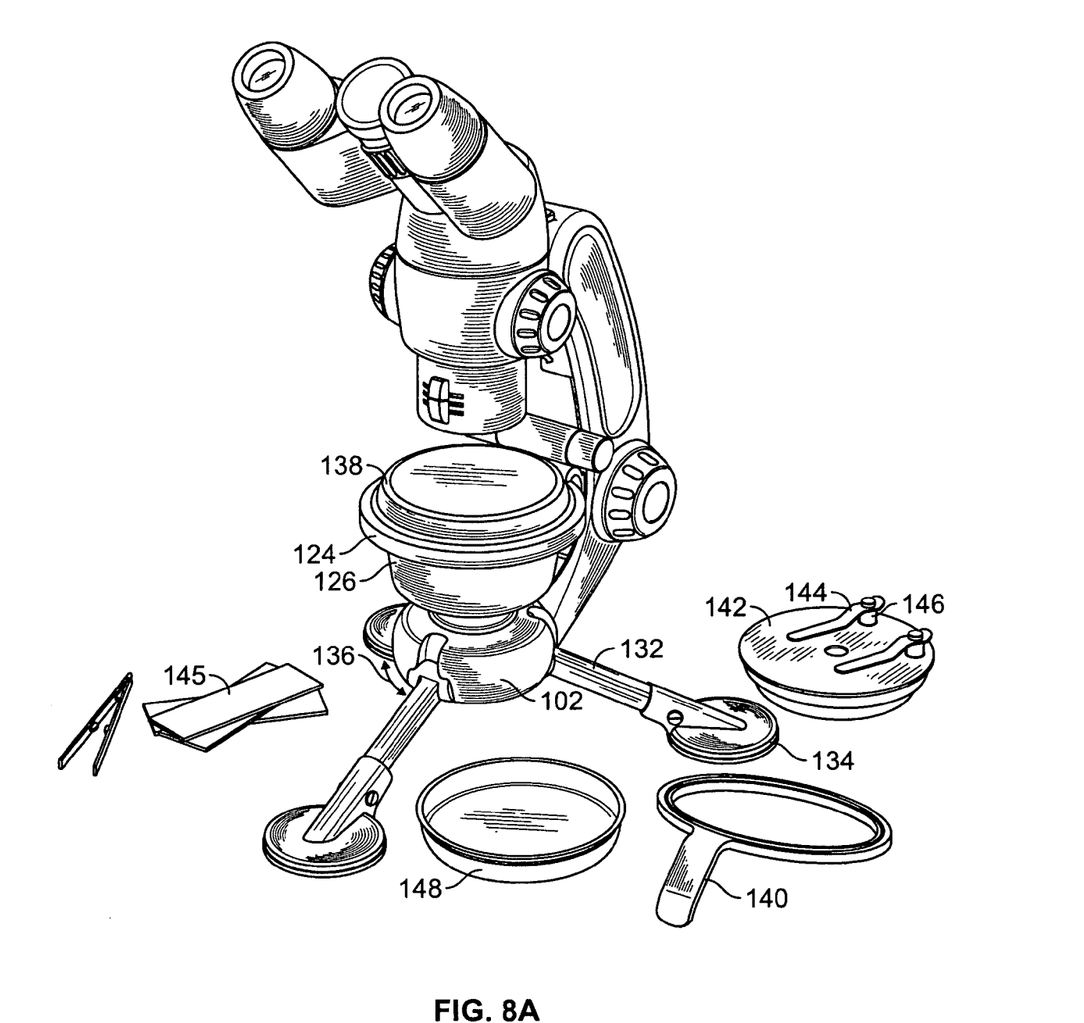
FIG. 8A is a perspective view of a microscope with the legs extended.
Figure 8B:
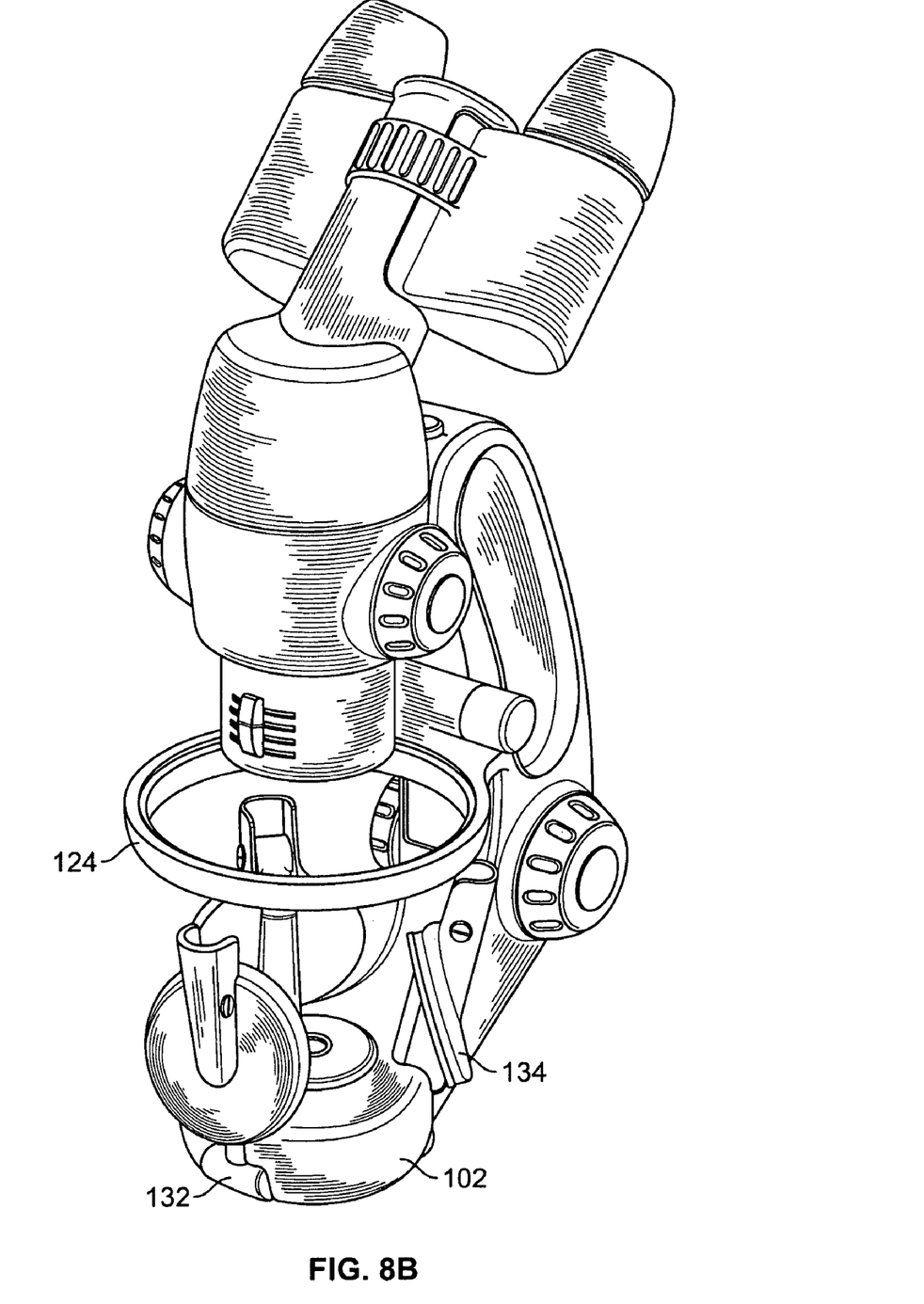
FIG. 8B is a perspective view of the microscope of FIG. 8A with the legs retracted.

Referring to FIG. 8A, the microscope 100 is shown with the tripodally arranged legs 132 fully extended and supporting the microscope 100 in a substantially vertical position. The legs 132 optionally include feet 134. Each foot 134 can pivot about a point at which the foot 134 is attached to the leg 132. Referring to FIG. 8B, the microscope 100 is shown with the legs 132, which can be pivotable about their respective point of attachment to the base 102, retracted into a closed position, with the feet 134 folded flat against each respective leg 132. The closed position of the legs 132 and feet 134 permit the microscope 100 to be compacted in size for storage and/or transport. The stage container 126 is removed from the stage frame 124 when the legs 132 are retracted into the closed position.

FIG. 8A shows various accessories that can be used with the microscope 100. For example, the transparent lid 138 of the stage container 126 can be replaced with a slide holder 142 including clips 144 to hold a slide 145 in place for viewing slide-mounted specimens. The slide holder 142 can optionally include an aperture 146 in which can be positioned a condenser lens to focus light emitted from the illuminator 130 beneath the stage 120 onto the slide-mounted specimen. For example, a 0.65× condenser lens can be included in the aperture 146.

A ring 140 including a handle can be snapped around a stage container 126 and used to move the container 126. A shallow tray 148 can replace the lid 138 of the stage container 126, thereby providing a surface for containing specimens, for example live insects, while keeping the specimens positioned relatively close to a distal objective lens (i.e., rather than in the bottom of the deeper stage container 126).

Figure 8C:
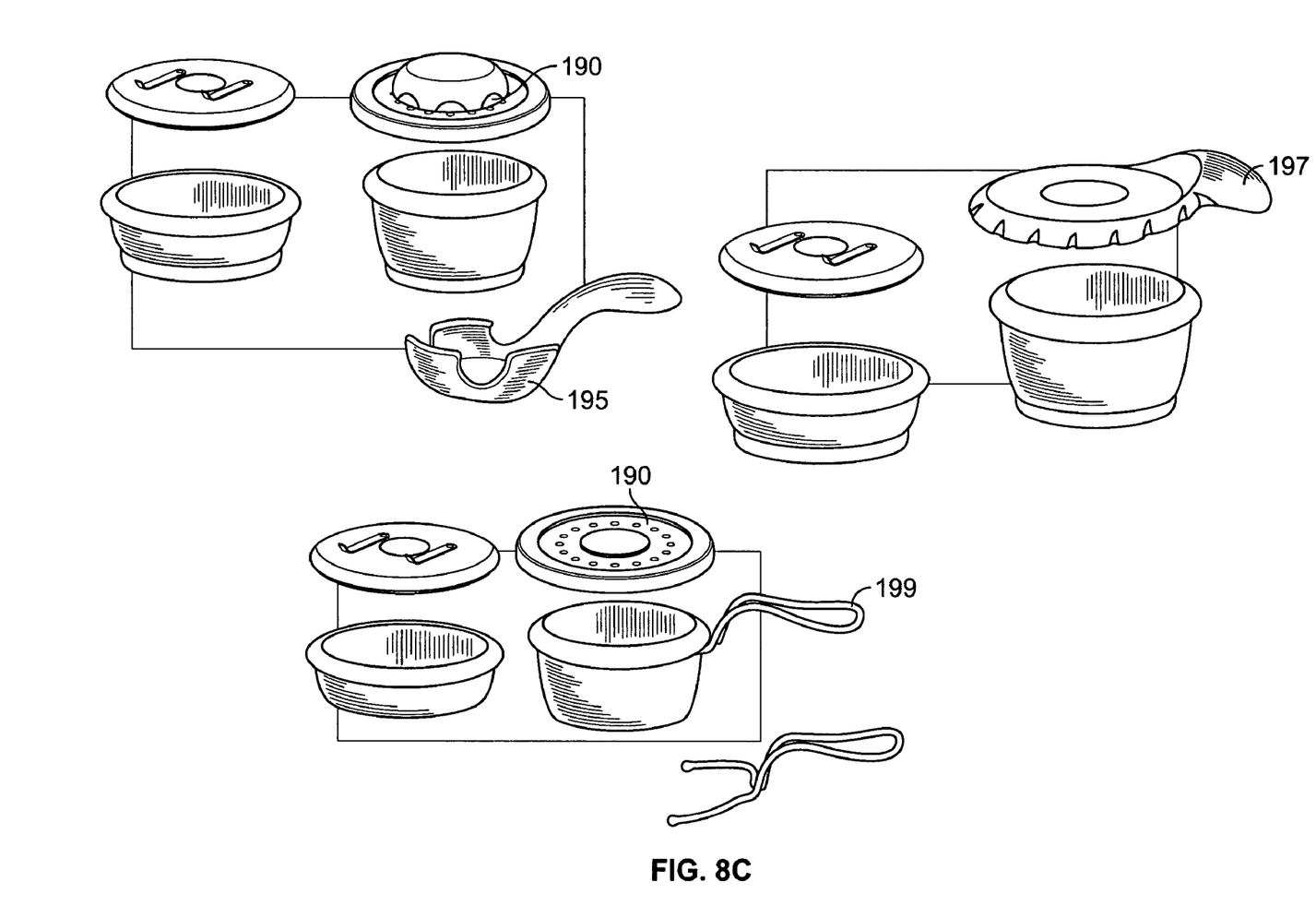
FIG. 8C shows various stage cups and accessories.

Referring to FIG. 8C, additional variations of the stage container 126 are shown. For example, the stage container 126 can include vents 190, perhaps to provide air to a live specimen. A spoon-shaped device 195 with a handle can be used to lift and move the stage container 126. Alternatively, a handle 197 can be included in a lid of a stage container 126, or a flexible metal handle 199 can be configured to snap-fit around the exterior of a lid of a stage container 126.

The microscope 100 can include a handle 160 attached to or forming part of the support arm 104. Providing a handle 160 encourages a user to properly handle the microscope 100 during transport, rather than grasping a less secure part of the microscope, such as the stage, or a more sensitive area, such as the nosepiece or eyepiece, which include the lenses. Optionally, the handle 160 can be covered with a slip-proof material and/or textured to further provide a firmer grip.

In the embodiment of the microscope 100 described above, monocular vision was provided. However, in another embodiment, stereoscopic vision can be provided. For stereoscopic vision, a lens changer 205 with a second, adjacent tumbler of lenses is used, as a second set of distal objective lenses is required. The additional lenses required for stereoscopic vision would increase the overall size and weight of the microscope 100. In the embodiment described, a binocular-body eyepiece 108 was included in the microscope. Other types of eyepieces 108 can be used, such as a single eyepiece, or a viewing screen, such as an LCD display screen, or a combination of the two.

In one embodiment, the microscope 100 can be formed from metal casting with a mold, and optionally with a textured and/or colored gripping handle 160. The metal may be aluminum, providing a relatively lightweight microscope 100. The stage container 126 can be formed from plastic, and may be injection molded. Other portions of the microscope 100, such as the knobs 118, 505 and 510 and feet 134 can also be formed from plastic, and may be injection molded. The microscope 100 may be powder coated with a reagent resistant paint for decorative purposes and to prevent corrosion and other damage to the microscope 100.

Figure 9A:
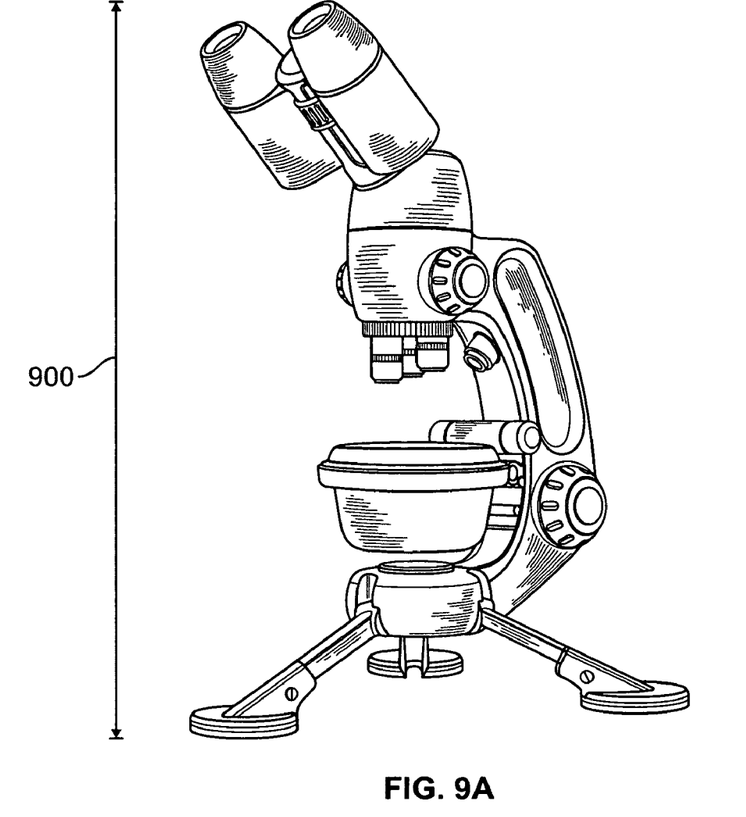
FIGS. 9A and B are perspective and top views respectively of a microscope showing dimensions.
Figure 9B:
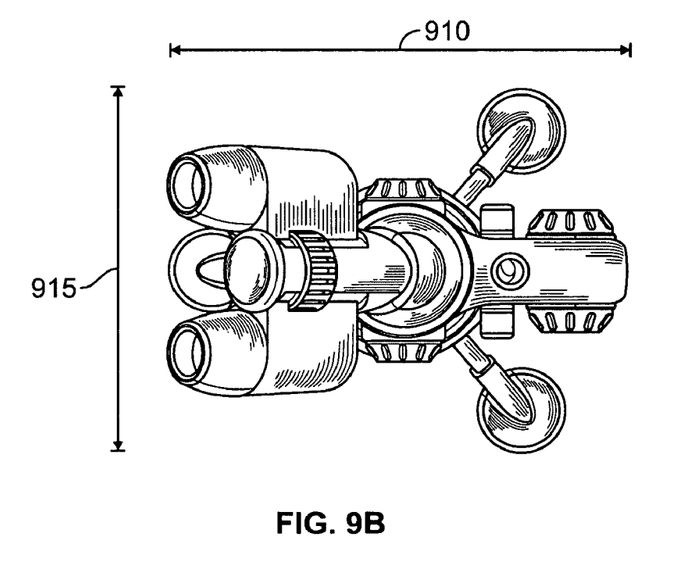

Referring to FIGS. 9A and 9B, in one embodiment, the microscope 100 can have a height 900 of approximately 33 cm (13 inches), a depth 905 of approximately 24 cm (9.6 inches), and a width 910 of approximately 21 cm (8.2 inches), which the legs 132 are in an extended position. When the stage container 126 is removed and the legs 132 are folded into a retracted position (as shown in FIG. 8B), the height 900 is reduced to approximately 29 cm (11.5 inches), the depth 905 is reduced to approximately 18 cm (7 inches) and the width is reduced to approximately 11 cm (4.4 inches).

Although only a few embodiments have been described in detail above, other modifications are possible. Other embodiments may be within the scope of the following claims.

What is claimed is:

1. A microscope, comprising:

a base, a support arm attached to and extending upwardly from the base, the support arm including a secondary stage height adjuster;

a head attached to the support arm, the head including at least a first distal objective lens and a second distal objective lens, only one of which is in communication with an eyepiece at a given time;

an eyepiece attached to the head and in optical communication with one of the distal objective lens at a given time;

a stage releasably attached to the support arm between the head and the base, where:

the stage is releasably attachable to the support arm at a plurality of locations between the head and the base providing a wide range of working distances between a lower surface of the head and an upper surface of a specimen being viewed with the microscope and can be attached in a first position such that when the first distal objective lens is in optical communication with the eyepiece, microscopic viewing is provided with magnification exceeding 45× and a working distance of 10 millimeters or less and can be attached in a second position such that when the second distal objective lens is in optical communication with the eyepiece, macroscopic viewing is provided with magnification less than 45× and a working distance exceeding 10 millimeters, and when the stage is attached to the support arm at a location, a working distance between the lower surface of the head and the upper surface of the specimen is further adjustable to an either greater or lesser working distance using the secondary stage height adjuster; and an illuminator positioned between the base and the stage.

2. The microscope of claim 1, wherein:

the head includes a first distal objective lens and a second distal objective lens, only one of which is in optical communication with the eyepiece at a given time; and the stage can be releasably attached to the support arm in a first position such that when the first distal objective lens is in optical communication with the eyepiece, microscopic viewing is provided with magnification exceeding 45× and a working distance of 10 millimeters or less, and the stage can be releasably attached to the support arm in a second position such that when the second distal objective lens is in optical communication with the eyepiece, macroscopic viewing is provided with magnification less than 45× and a working distance exceeding 10 millimeters.

3. The microscope of claim 1, further comprising:

at least three legs attached to the base.

4. The microscope of claim 3, wherein the at least three legs are pivotable between at least an open position, wherein the legs support the microscope in a substantially vertical position and a closed position.

5. The microscope of claim 3, wherein each of the at least three legs include a foot pivotable about a point at which a foot attaches to a respective leg.

6. The microscope of claim 1, wherein the illuminator is battery-powered, the microscope further comprising:

a battery electrically connected to the illuminator.

7. The microscope of claim 1, wherein the illuminator comprises at least one LED.

8. The microscope of claim 1, wherein the secondary stage height adjuster includes a rack and pinion mechanism for further adjusting the upper surface of the specimen to either a greater or lesser working distance when the stage is attached to the support arm at a location.

9. The microscope of claim 1, wherein the support arm includes a handle.

10. The microscope of claim 1, wherein the stage comprises a substantially transparent container including an interior region configured to contain a specimen.

11. The microscope of claim 1, wherein the stage comprises a frame and a container releasably attached to the frame.

12. The microscope of claim 1, wherein microscopic viewing is provided at a plurality of magnification levels between approximately 50× and 200× with an approximate working distance of 5 millimeters.

13. The microscope of claim 1, wherein macroscopic viewing is provided at a plurality of magnification levels between approximately 5× and 40× with approximate working distances between 70 and 80 millimeters.

* * * * *